United States Patent
Takahashi et al.

(10) Patent No.: US 9,378,876 B2
(45) Date of Patent: *Jun. 28, 2016

(54) FERROMAGNETIC PARTICLES AND PROCESS FOR PRODUCING THE SAME, AND ANISOTROPIC MAGNET, BONDED MAGNET AND COMPACTED MAGNET

(75) Inventors: Migaku Takahashi, Sendai (JP); Tomoyuki Ogawa, Sendai (JP); Yasunobu Ogata, Sendai (JP); Naoya Kobayashi, Otake (JP); Chammika Ruwan Polwatta Gallage, Otake (JP); Kaori Kohara, Otake (JP)

(73) Assignees: TODA KOGYO CORPORATION, Hiroshima (JP); TOHOKU UNIVERSITY, Sendai (JP)

( * ) Notice: Subject to any disclaimer, the term of this patent is extended or adjusted under 35 U.S.C. 154(b) by 212 days.

This patent is subject to a terminal disclaimer.

(21) Appl. No.: 13/980,703

(22) PCT Filed: Jan. 19, 2012

(86) PCT No.: PCT/JP2012/051075
§ 371 (c)(1),
(2), (4) Date: Sep. 9, 2013

(87) PCT Pub. No.: WO2012/099202
PCT Pub. Date: Jul. 26, 2012

(65) Prior Publication Data
US 2014/0001398 A1 Jan. 2, 2014

(30) Foreign Application Priority Data
Jan. 21, 2011 (JP) ................. 2011-010695

(51) Int. Cl.
*H01F 1/00* (2006.01)
*H01F 1/06* (2006.01)
*B22F 1/02* (2006.01)
*B22F 9/22* (2006.01)
*H01F 1/01* (2006.01)
*C22C 29/16* (2006.01)
*H01F 41/02* (2006.01)
*C01B 21/06* (2006.01)
*H01F 1/08* (2006.01)
*H01F 41/00* (2006.01)
*C22C 21/00* (2006.01)

(52) U.S. Cl.
CPC .. *H01F 1/01* (2013.01); *B22F 1/02* (2013.01); *B22F 9/22* (2013.01); *C01B 21/0622* (2013.01); *C22C 29/16* (2013.01); *H01F 1/065* (2013.01); *H01F 1/083* (2013.01); *H01F 41/00* (2013.01); *H01F 41/0266* (2013.01); *B22F 2999/00* (2013.01); *C01P 2004/54* (2013.01); *C01P 2004/61* (2013.01); *C01P 2006/12* (2013.01); *C01P 2006/42* (2013.01); *C22C 21/00* (2013.01)

(58) Field of Classification Search
CPC .. B22F 9/22; B22F 2999/00; B22F 2201/013; B22F 1/02; H01F 1/01; H01F 1/06; H01F 1/065; H01F 1/061; H01F 1/08; H01F 1/083; H01F 1/11; H01F 1/10; H01F 1/0054; H01F 41/0266; H01F 41/00; H01F 41/02; H01F 41/026; H01F 7/02; C01P 2004/54; C01P 2004/64; C01P 2004/61; C01P 2004/51; C01P 2006/42; C01P 2006/12; C22C 29/16; C22C 38/001; C22C 33/0235; B82Y 25/00; Y10T 428/2991
USPC ............. 252/62.51 R, 62.56, 62.55; 148/230, 148/306, 105, 287, 317, 537; 428/402, 403, 428/570
See application file for complete search history.

(56) References Cited

U.S. PATENT DOCUMENTS

2006/0283290 A1* 12/2006 Hattori ............... G11B 5/70626
75/348
2009/0087688 A1* 4/2009 Masaki ............. G11B 5/70626
428/842.6

(Continued)

FOREIGN PATENT DOCUMENTS

EP 2 620 955 A1 7/2013
JP 08-088110 4/1996

(Continued)

OTHER PUBLICATIONS

Kita et al., "Magnetic properties of core-shell type Fe16N2 nanooparticles", available online Nov. 21, 2006, Journal of Magnetism and Magnetic Materials, 310, pp. 2144-2413.*
Duh et al., "Nitriding kinetics of Fe—Al—Mn—Cr—C alloys at 1000 C", 1990, Journal of Materials Science, 25, pp. 2615-2618.*
Kita et al., "Magnetic properties of core-shell type Fe1 6N2 nanooparticles", available online Nov. 21, 2006, Journal of Magnetism and Magnetic Materials, 310, pp. 2144-2413.*
International Search Report for PCT/JP2012/051075, mailed Apr. 17, 2012.

(Continued)

*Primary Examiner* — Matthew E Hoban
*Assistant Examiner* — Lynne Edmondson
(74) *Attorney, Agent, or Firm* — Nixon & Vanderhye P.C.

(57) ABSTRACT

Ferromagnetic particles including an $Fe_{16}N_2$ compound phase in an amount of not less than 80% as measured by Mössbauer spectrum and each having an outer shell in which FeO is present in the form of a film having a thickness of not more than 5 nm. Ferromagnetic particles may be made by subjecting iron oxide or iron oxyhydroxide having an average major axis diameter of 40 to 5000 nm and an aspect ratio (major axis diameter/minor axis diameter) of 1 to 200 as a starting material to dispersing treatment to prepare aggregated particles; subjecting the iron compound particles passed through a mesh to hydrogen reducing treatment at a temperature of 160 to 420° C.; and then subjecting the resulting particles to nitridation treatment at a temperature of 130 to 170° C.

6 Claims, No Drawings

(56) References Cited

U.S. PATENT DOCUMENTS

| | | | |
|---|---|---|---|
| 2009/0252991 A1* | 10/2009 | Ishikawa et al. | 428/800 |
| 2011/0059005 A1* | 3/2011 | Sankar | C01B 21/0622 423/409 |
| 2012/0244356 A1* | 9/2012 | Takahashi | B82Y 30/00 428/402 |
| 2014/0085023 A1* | 3/2014 | Takahashi et al. | 335/302 |

FOREIGN PATENT DOCUMENTS

| | | | |
|---|---|---|---|
| JP | 2005-310857 | 11/2005 | |
| JP | WO 2011049080 A1 * | 4/2011 | B82Y 30/00 |
| JP | 2012-069811 | 4/2012 | |

OTHER PUBLICATIONS

Nagatomi, A. et al., "Synthesis of Iron Nitrides FexN (x : 2, 2-3, 4, 16/2) by Nitrogenizing α—Fe in Ammonia Gas, and Magnetic Properties of the Bulk Sample of Fe16N2", Journal of the Japan Society of Powder and Powder Metallurgy, vol. 46, No. 2, (Feb. 1999), pp. 151 to 155.

Hattori, Takeshi et al., "Magnetic Properties of Fe16N2 Fine Particles", Journal of Magnetics Society of Japan, vol. 25, No. 4-2, pp. 927-930. (2001).

International Preliminary Examination Report (English version) in PCT/JP2012/051075 dated Aug. 1, 2013.

Nagatomi et al, "Synthesis of Iron Nitrides . . . ", Journal of the Japan Society of Powder and Powder Metallurgy vol. 46, No. 2, pp. 151-155, 1999.

Hattori et al, "Magnetic Properties of . . . ", Journal of the Magnetics Society of Japan, vol. 25, No. 4-2, 927-930 (2001).

Takahashi, "Study on synthesis and magnetism of non-equilibrium α',α",γ phases in (C, N)-added Fe-based alloy thin film," Doctoral Thesis, 2001, First Chapter (pp. 1-31), Graduate School of Tohoku University, School of Engineering, Electrical Engineering (w/ partial translation); <http://iss.ndl.go.jp/books/R100000039-I002028352-00>.

Jack, "The occurrence and the crystal structure of α"—iron nitride; a new type of interstitial alloy formed during the tempering of nitrogen-martinesite," *Proc. Roy. Soc. A.*, 1951, vol. 208, pp. 216-224.

\* cited by examiner

FERROMAGNETIC PARTICLES AND PROCESS FOR PRODUCING THE SAME, AND ANISOTROPIC MAGNET, BONDED MAGNET AND COMPACTED MAGNET

This application is the U.S. national phase of International Application No. PCT/JP2012/051075, filed 19 Jan. 2012, which designated the U.S. and claims priority to Japan Application No. 2011-010695, filed 21 Jan. 2011, the entire contents of each of which are hereby incorporated by reference.

TECHNICAL FIELD

The present invention relates to ferromagnetic particles comprising a core formed of $Fe_{16}N_2$ and an outer shell covering the core which is formed of a very thin oxide film of FeO, and a process for producing the ferromagnetic particles, and also provides an anisotropic magnet, a bonded magnet and a compacted magnet using the ferromagnetic particles.

BACKGROUND ART

At present, as a magnet for motors requiring a power torque which are used in various applications including not only hybrid cars and electric cars but also familiar domestic appliances such as air conditioners and washing machines, there have been used Nd—Fe—B-based magnetic particles and a molded product thereof. However, there is almost present a theoretical limitation with respect to use of the Nd—Fe—B-based magnetic material as a magnet.

In addition, supply of rare earth elements as the raw materials largely depends upon import from china in view of low costs of the raw materials and a low content of isotope elements in the raw materials, i.e., there is present the large problem of so-called "china risk". For this reason, Fe—N-based compounds such as $Fe_{16}N_2$ containing no rare earth elements have been noticed.

Among the Fe—N-based compounds, $\alpha''$-$Fe_{16}N_2$ is known as a metastable compound that is crystallized when subjecting a martensite or a ferrite comprising nitrogen in the form of a solid solution therewith to annealing for a long period of time. The $\alpha''$-$Fe_{16}N_2$ has a "bct" crystal structure, and therefore it is expected that the $\alpha''$-$Fe_{16}N_2$ provides a giant magnetic substance having a large saturation magnetization. However, as understood from the "metastable compound", there have been reported only very few successful cases where the compounds could be chemically synthesized in the form of isolated particles.

Hitherto, in order to obtain an $\alpha''$-$Fe_{16}N_2$ single phase, various methods such as a vapor deposition method, an MBE method (molecular beam epitaxy method), an ion implantation method, a sputtering method and an ammonia nitridation method have been attempted. However, production of more stabilized $\gamma'$-$Fe_4N$ or $\epsilon$-$Fe_{2-3}N$ is accompanied with an eutectic crystal of martensite ($\alpha'$-Fe)-like metal or ferrite ($\alpha$-Fe)-like metal, which tends to cause difficulty in producing the $\alpha''$-$Fe_{16}N_2$ single phase compound in an isolated state. In some cases, it has been reported that the $\alpha''$-$Fe_{16}N_2$ single phase compound is produced in the form of a thin film. However, the $\alpha''$-$Fe_{16}N_2$ single phase compound in the form of such a thin film may be applied to magnetic materials only in a limited range, and tends to be unsuitable for use in still more extensive application fields.

The following known techniques concerning the $\alpha''$-$Fe_{16}N_2$ have been proposed.

PRIOR ART DOCUMENTS

Patent Documents

Patent Document 1: Japanese Patent Application Laid-Open (KOKAI) No. 11-340023
Patent Document 2: Japanese Patent Application Laid-Open (KOKAI) No. 2000-277311
Patent Document 3: Japanese Patent Application Laid-Open (KOKAI) No. 2009-84115
Patent Document 4: Japanese Patent Application Laid-Open (KOKAI) No. 2008-108943
Patent Document 5: Japanese Patent Application Laid-Open (KOKAI) No. 2008-103510
Patent Document 6: Japanese Patent Application Laid-Open (KOKAI) No. 2007-335592
Patent Document 7: Japanese Patent Application Laid-Open (KOKAI) No. 2007-258427
Patent Document 8: Japanese Patent Application Laid-Open (KOKAI) No. 2007-134614
Patent Document 9: Japanese Patent Application Laid-Open (KOKAI) No. 2007-36027
Patent Document 10: Japanese Patent Application Laid-Open (KOKAI) No. 2009-249682

Non-Patent Documents

Non-Patent Document 1: M. Takahashi, H. Shoji, H. Takahashi, H. Nashi, T. Wakiyama, M. Doi and M. Matsui, "J. Appl. Phys.", Vol. 76, pp. 6642-6647, 1994.
Non-Patent Document 2: Y. Takahashi, M. Katou, H. Shoji and M. Takahashi, "J. Magn. Magn. Mater.", Vol. 232, pp. 18-26, 2001.

SUMMARY OF THE INVENTION

Problem to be Solved by the Invention

However, the techniques described in the above Patent Documents 1 to 10 and Non-Patent Documents 1 and 2 have still failed to improve properties of the magnetic materials to a sufficient extent.

That is, in Patent Document 1, it is described that iron particles on which a surface oxide film is present are subjected to reducing treatment and then to nitridation treatment to obtain $Fe_{16}N_2$. However, in the Patent Document 1, it is not taken into consideration to enhance a maximum energy product of the material. In addition, in Patent Document 1, it is required that the nitridation reaction is conducted for a prolonged period of time (such as, for example, from 3 to 10 days). Therefore, the technique described in Patent Document 1 has failed to provide an industrially suitable process.

Also, in Patent Document 2, it is described that iron oxide particles are subjected to reducing treatment to produce metallic iron particles, and the resulting metallic iron particles are subjected to nitridation treatment to obtain $Fe_{16}N_2$. However, in Patent Document 2, the resulting particles are used as magnetic particles for magnetic recording media and therefore tend to be unsuitable as a hard magnetic material that is required to have a high maximum energy product $BH_{max}$.

Also, in Patent Documents 3 to 9, there are described giant magnetic substances for magnetic recording materials which can be used instead of ferrite. However, the magnetic substances are produced in the form of not an $\alpha''$-$Fe_{16}N_2$ single phase but a mixed phase of still stabler $\gamma'$-$Fe_4N$ or $\epsilon$-$Fe_{2-3}N$, and martensite ($\alpha'$-Fe)-like metal or ferrite ($\alpha$-Fe)-like metal.

Also, in Patent Document 10, it is described that the use of additive elements is essential, but there are no detailed discussions concerning the need for the additive elements. Further, the obtained product tends to be not suitable as a hard magnetic material that is required to have a high maximum energy product $BH_{max}$, in view of magnetic properties thereof.

In Non-Patent Documents 1 and 2, the $\alpha''$-$Fe_{16}N_2$ single phase has been successfully produced in the form of a thin film. However, the $\alpha''$-$Fe_{16}N_2$ single phase in the form of such a thin film is usable in only limited applications, and therefore unsuitable for use in more extensive applications. Further, these conventional materials have problems concerning productivity and economy when producing a generally used magnetic material therefrom.

In consequence, an object of the present invention is to provide $Fe_{16}N_2$ ferromagnetic particles having a high purity whose surface is coated with a very thin FeO film, and a process for producing the ferromagnetic particles, and an anisotropic magnet, a bonded magnet and a compacted magnet obtained by using the ferromagnetic particles.

Means for Solving the Problem

The above conventional problems can be solved by the following aspects of the present invention.

That is, according to the present invention, there are provided ferromagnetic particles comprising an $Fe_{16}N_2$ compound phase in an amount of not less than 80% as measured by Mössbauer spectrum, and each having an outer shell in which FeO is present in the form of a film having a thickness of not more than 5 nm (Invention 1).

According to the present invention, there are provided the ferromagnetic particles as described in the above Invention 1, wherein a volume fraction of the FeO present on the surface of the respective ferromagnetic particles is controlled such that a ratio of a volume of the FeO to a whole volume of the particles is not more than 25% (Invention 2).

Also, according to the present invention, there are provided the ferromagnetic particles as described in the above Invention 1 or 2, wherein a coercive force $H_c$ of the ferromagnetic particles is not less than 1.5 kOe, and a saturation magnetization value $\sigma_s$ of the ferromagnetic particles as measured at 5 K is not less than 150 emu/g (Invention 3).

Also, according to the present invention, there are provided the ferromagnetic particles as described in any one of the above Inventions 1 to 3, wherein a nitridation rate of the ferromagnetic particles as determined from a lattice constant thereof is 8 to 13 mol % (Invention 4).

Also, according to the present invention, there are provided the ferromagnetic particles as described in any one of the above Inventions 1 to 4, wherein a BET specific surface area of the ferromagnetic particles is 5 to 40 $m^2/g$ (Invention 5).

In addition, according to the present invention, there is provided a process for producing the ferromagnetic particles as described in any one of the above Inventions 1 to 5, comprising the steps of:

subjecting iron oxide or iron oxyhydroxide having an average major axis diameter of 40 to 5000 nm and an aspect ratio (major axis diameter/minor axis diameter) of 1 to 200 as a starting material to dispersing treatment to prepare aggregated particles having D50 of not more than 40 μm and D90 of not more than 150 μm;

allowing the obtained aggregated particles to pass through a mesh having a size of not more than 250 μm;

subjecting the iron compound particles passed through the mesh to hydrogen reducing treatment at a temperature of 160 to 420° C.; and then subjecting the resulting particles to nitridation treatment at a temperature of 130 to 170° C. (Invention 6).

Further, according to the present invention, there is provided an anisotropic magnet comprising the ferromagnetic particles as described in any one of the above Inventions 1 to 5 (Invention 7).

Furthermore, according to the present invention, there is provided a bonded magnet comprising the ferromagnetic particles as described in any one of the above Inventions 1 to 5 (Invention 8).

Still furthermore, according to the present invention, there is provided a compacted magnet comprising the ferromagnetic particles as described in any one of the above Inventions 1 to 5 (Invention 9).

Effect of the Invention

The ferromagnetic particles according to the present invention can be suitably used as a stable magnetic material having an extremely high purity.

Further, in the process for producing the ferromagnetic particles according to the present invention, it is possible to readily produce stable $Fe_{16}N_2$ particles having a high purity, and therefor the production process is suitable as a process for producing ferromagnetic particles.

PREFERRED EMBODIMENTS FOR CARRYING OUT THE INVENTION

First, the ferromagnetic particles according to the present invention are described.

The ferromagnetic particles according to the present invention comprise an $Fe_{16}N_2$ compound phase in an amount of not less than 80% as measured by Mössbauer spectrum. In the Mössbauer spectrum, upon production of $Fe_{16}N_2$, a peak of an iron site having an internal magnetic field of not less than 330 kOe is observed. In particular, there is such a feature that the peak is observed in the vicinity of 395 kOe.

In general, when the content of other phases than the above compound phase in the ferromagnetic particles is increased, the resulting particles tend to strongly exhibit properties as those of a soft magnet and therefore tend to be unsuitable as a material for a ferromagnetic hard magnet. However, the ferromagnetic particles of the present invention can exhibit properties as a material for a ferromagnetic hard magnet to a sufficient extent.

The ferromagnetic particles respectively comprise a core formed of $Fe_{16}N_2$ and an outer shell in which FeO is present to thereby form a simple structure of $Fe_{16}N_2$/FeO from the core towards the outer shell. The $Fe_{16}N_2$ and FeO are preferably topotactically bonded to each other to form a crystallographically continuous structure. The oxide film of the outer shell contains none of $Fe_3O_4$, $Fe_2O_3$ and $\alpha$-Fe. When the $Fe_{16}N_2$ particles have a low purity, these impurities may be contained in the resulting particles. However, the high-purity particles have an outer shell comprising FeO only. The thickness of the FeO film of the outer shell is not more than 5 nm and preferably not more than 4 nm. With the increase in purity of the $Fe_{16}N_2$ particles, the thickness of the FeO film tends to be reduced. The thickness of the FeO film is not particularly limited, and is preferably as small as possible because a volume fraction of $Fe_{16}N_2$ in the particles is improved. The lower limit of the thickness of the FeO film is about 0.5 nm.

The volume fraction of FeO on the surface of the respective ferromagnetic particles according to the present invention is controlled such that the ratio of the volume of FeO to a whole volume of the particles is preferably not more than 25%. When the purity of $Fe_{16}N_2$ in the particles is increased, the volume fraction of FeO therein is reduced. The volume fraction of FeO in the respective ferromagnetic particles is more preferably not more than 23% and still more preferably 3 to 20%.

The ferromagnetic particles according to the present invention preferably have a coercive force $H_c$ of not less than 1.5 kOe and a saturation magnetization value $\sigma_s$ of not less than 150 emu/g as measured at 5 K. When the saturation magnetization value $\sigma_s$ and the coercive force $H_c$ of the ferromagnetic particles are respectively out of the above-specified ranges, the resulting ferromagnetic particles may fail to exhibit sufficient magnetic properties required for a hard magnetic material. More preferably, the coercive force $H_c$ of the ferromagnetic particles is not less than 1.6 kOe, and the saturation magnetization value $\sigma_s$ of the ferromagnetic particles is not less than 180 emu/g.

The ferromagnetic particles according to the present invention preferably have a nitridation rate of 8 to 13 mol % as determined from a lattice constant thereof. An optimum nitridation rate of the ferromagnetic particles as determined from a chemical composition of $Fe_{16}N_2$ is 11.1 mol %. The nitridation rate of the ferromagnetic particles is more preferably 8.5 to 12.5 mol % and still more preferably 9.0 to 12 mol %.

The ferromagnetic particles according to the present invention preferably have a BET specific surface area of 5.0 to 40 m$^2$/g. When the BET specific surface area of the ferromagnetic particles is less than 5 m$^2$/g, the nitridation rate of the ferromagnetic particles tends to be lowered, so that the production rate of $Fe_{16}N_2$ therein tends to be decreased, and it may be difficult to obtain ferromagnetic particles having desired coercive force and saturation magnetization. When the BET specific surface area of the ferromagnetic particles is more than 40 m$^2$/g, it may be difficult to obtain ferromagnetic particles having desired coercive force and saturation magnetization. The BET specific surface area of the ferromagnetic particles is more preferably 5.5 to 38 m$^2$/g and still more preferably 6.0 to 35 m$^2$/g.

Next, the process for producing the ferromagnetic particles according to the present invention is described.

The ferromagnetic particles according to the present invention may be produced as follows. That is, as the starting material, there is used iron oxide or iron oxyhydroxide which has an average major axis diameter of 40 to 5000 nm and an aspect ratio (major axis diameter/minor axis diameter) of 1 to 200. The iron oxide or iron oxyhydroxide is subjected to dispersing treatment to prepare aggregated particles having D50 of not more than 40 μm and D90 of not more than 150 μm. After allowing the aggregated particles to pass through a mesh having a size of not more than 250 μm, the obtained iron compound particles are subjected to hydrogen reducing treatment at a temperature of 160 to 420° C. and then to nitridation treatment at a temperature of 130 to 170° C., thereby obtaining the ferromagnetic particles as the aimed product. FeO being present in the outer shell of the respective particles is produced by oxidation of a metallic iron portion formed by removing nitrogen only from a boundary of surfaces of the particles after the nitridation treatment.

In the present invention, the iron oxide or iron oxyhydroxide which has an average major axis diameter of 40 to 5000 nm and an aspect ratio (major axis diameter/minor axis diameter) of 1 to 200 is used as the starting material.

Examples of the iron oxide or iron oxyhydroxide as the starting material include magnetite, $\gamma$-$Fe_2O_3$, $\alpha$-$Fe_2O_3$, $\alpha$-FeOOH, $\beta$-FeOOH, $\gamma$-FeOOH and FeO, although not particularly limited thereto. The starting material may be in the form of a single phase, or may comprise impurities. As the impurities, the starting material may also comprise iron oxide or iron oxyhydroxide other than those contained in a main phase thereof.

The particle shape of the iron oxide or iron oxyhydroxide used as the starting material is not particularly limited, and may have any shape such as an acicular shape, a granular shape, a spindle shape, a rectangular parallelopiped shape and a spherical shape.

The iron compound particles used in the present invention preferably have an aspect ratio (major axis diameter/minor axis diameter) of 1.0 to 200. When the aspect ratio of the iron compound particles is more than the above-specified range, it may be difficult to obtain the aimed ferromagnetic particles comprising an $Fe_{16}N_2$ compound phase in an amount of not less than 80% as measured by Mössbauer spectrum. The aspect ratio of the iron compound particles is more preferably 1.0 to 190 and still more preferably 1.0 to 180.

The BET specific surface area of the iron compound particles as the starting material is preferably 20 to 250 m$^2$/g. When the BET specific surface area of the iron compound particles is less than 20 m$^2$/g, the nitridation of the iron compound particles tends to hardly proceed, so that it may be difficult to obtain the aimed ferromagnetic particles comprising an $Fe_{16}N_2$ compound phase in an amount of not less than 80% as measured by Mössbauer spectrum. When the BET specific surface area of the iron compound particles is more than 250 m$^2$/g, the nitridation of the iron compound particles tends to excessively proceed, so that it may also be difficult to obtain the aimed ferromagnetic particles comprising an $Fe_{16}N_2$ compound phase in an amount of not less than 80% as measured by Mössbauer spectrum. The BET specific surface area of the iron compound particles is more preferably 30 to 200 m$^2$/g and still more preferably 35 to 180 m$^2$/g.

The particle diameter of the aggregated particles of the iron oxide or iron oxyhydroxide used as the starting material in the present invention is preferably controlled such that D50 thereof is not more than 40 μm and D90 thereof is not more than 150 μm. Since the starting material used in the present invention is in the form of particles, the aggregated particles thereof generally have a considerably large particle diameter. The method of reducing the particle diameter of the aggregated particles is not particularly limited. For example, there may be used a method of subjecting the aggregated particles to wet atomization using a ball mill or a planetary ball mill or to pulverization using a jet mill, in the presence of an organic solvent such as an alcohol compound, a ketone compound, toluene, hexane, carbon tetrachloride and cyclohexane. The particle diameter of the aggregated particles of the iron oxide or iron oxyhydroxide used as the starting material in the present invention is more preferably controlled such that D50 thereof is not more than 35 μm and D90 thereof is not more than 125 μm, still more preferably controlled such that D50 thereof is not more than 30 μm and D90 thereof is not more than 100 μm.

The iron compound particles used in the present invention are preferably allowed to previously pass through a mesh having a size of not more than 250 μm before subjected to the heat treatments. When the mesh size is more than 250 μm, it may be difficult to obtain the ferromagnetic particles capable of exhibiting desired magnetic properties. The mesh size is more preferably not more than 236 μm.

When the iron oxyhydroxide is subjected to dehydration treatment according to the requirement, the temperature of the dehydration treatment is preferably 80 to 350° C. When the temperature of the dehydration treatment is lower than 80° C., substantially no dehydration tends to proceed. When the temperature of the dehydration treatment is higher than 350° C., it may be difficult to obtain metallic iron particles at a low temperature in the subsequent reducing treatment. The temperature of the dehydration treatment is preferably 85 to 300° C.

The dehydration treatment may be followed by pulverization treatment using a jet mill, a ball mill or the like. These treatments may be suitably carried out in an inert gas such as helium, argon and nitrogen.

The atmosphere used upon the dehydration treatment is preferably air or a nitrogen atmosphere.

The temperature used upon the reducing treatment is 160 to 420° C. When the reducing treatment temperature is lower than 160° C., the iron compound particles may fail to be reduced into metallic iron to a sufficient extent. When the reducing treatment temperature is higher than 420° C., although the iron compound particles can be reduced into metallic iron, the sintering between the particles also tends to undesirably proceed, resulting in deteriorated nitridation rate thereof. The reducing treatment temperature is preferably 165 to 380° C. and more preferably 170 to 350° C.

The reducing method is not particularly limited. There may be used those reducing methods using a hydrogen gas flow or various hydride compounds.

The reducing treatment time is not particularly limited, and is preferably 1 to 24 h. When the reducing treatment time is longer than 24 h, the sintering between the particles tends to proceed depending upon the reducing treatment temperature, so that the nitridation treatment as the subsequent stage treatment tends to hardly proceed. When the reducing treatment time is shorter than 1 h, the reducing treatment tends to often become insufficient. The reducing treatment time is more preferably 1.5 to 15 h.

The reducing treatment may be followed by pulverization treatment using a jet mill, a ball mill or the like. These treatments may be suitably carried out in an inert gas such as helium, argon and nitrogen.

After completion of the reducing treatment, the nitridation treatment is carried out.

The nitridation treatment temperature is 130 to 170° C. When the nitridation treatment temperature is lower than 130° C., the nitridation treatment tends to hardly proceed to a sufficient extent. When the nitridation treatment temperature is higher than 170° C., $\gamma'$-$Fe_4N$ or $\epsilon$-$Fe_{2-3}N$ tends to be undesirably produced, so that it may be difficult to obtain the aimed ferromagnetic particles comprising an $Fe_{16}N_2$ compound phase in an amount of not less than 80% as measured by Mössbauer spectrum. The nitridation treatment temperature is preferably 135 to 165° C.

The nitridation treatment time is preferably not longer than 50 h. When the step is completed for a time period as short as possible, the yield per unit time can be increased, so that it is possible to attain an excellent industrial productivity. Therefore, the nitridation treatment time is more preferably not longer than 36 h.

The atmosphere used upon the nitridation treatment is preferably an $NH_3$ atmosphere. As the nitridation treatment atmosphere, in addition to $NH_3$, there may also be used $N_2$, $H_2$, a hydrocarbon gas such as $CH_4$ and a mixture of these gases with a superheated steam, etc.

The nitridation treatment may be accomplished until reaching a nitridation rate of almost 100% as long as the nitridation treatment is carried out in the above adequate temperature range for a sufficient treating time. In such a case, it will be possible to obtain the ferromagnetic particles comprising an $Fe_{16}N_2$ compound phase in an amount of near 100%, i.e., those particles comprising almost 100% of the $Fe_{16}N_2$ compound phase which undergo substantially no oxidation by oxygen in air when taken out after the nitridation treatment and therefore comprise substantially no FeO in an outer shell thereof. However, as described above, production of the ferromagnetic particles comprising 100% of an $Fe_{16}N_2$ compound phase tends to have no reality from the industrial viewpoints. According to the present inventors' study, it has been apparently found that even though the nitridation treatment is conducted to such an extent that the content of the $Fe_{16}N_2$ compound phase in the ferromagnetic particles is not 100% but 80% or more and FeO is therefore produced in the outer shell of the respective particles as a result of oxidation of metallic iron present on the surface of the respective particles obtained after the nitridation treatment by oxygen in air, the thus produced FeO has no adverse influence on magnetic properties of the resulting ferromagnetic particles as long as a film thickness of the FeO is not more than 5 nm.

Therefore, it is not required that the nitridation treatment is carried out until the resulting particles comprise almost 100% of an $Fe_{16}N_2$ compound phase, and the nitridation treatment may be carried out to such an extent that the film thickness of FeO is not more than 5 nm. For example, the film thickness of FeO may be adjusted by appropriately selecting the nitridation treatment time.

Next, the anisotropic magnet according to the present invention is described.

The magnetic particles of the anisotropic magnet according to the present invention may be controlled so as to attain desired magnetic properties (such as a coercive force, a residual magnetic flux density and a maximum energy product) according to the purposes and applications as aimed.

The magnetic orientation method of the magnet is not particularly limited. For example, the ferromagnetic particles comprising an $Fe_{16}N_2$ compound phase in an amount of not less than 80% as measured by Mössbauer spectrum may be mixed and kneaded together with a dispersant, etc., in an EVA resin (ethylene-vinyl acetate copolymer) at a temperature not lower than a glass transition temperature thereof and then molded, and a desired external magnetic field may be applied to the resulting molded product at a temperature nearly exceeding the glass transition temperature to accelerate a magnetic orientation of the molded product. Alternatively, a resin such as a urethane resin, an organic solvent and the above ferromagnetic particles may be strongly mixed with each other using a paint shaker, etc., and pulverized to prepare an ink, and the resulting ink may be applied and printed on a resin film with a blade or by a roll-to-roll method, and rapidly passed through a magnetic field to magnetically orient the resulting coated film. In addition, the magnetic orientation may be conducted by RIP (resin isostatic pressing) method in order to attain a still higher density and maximize a crystal magnetic anisotropy. The ferromagnetic particles may be previously provided on a surface thereof with an insulation coating film of silica, alumina, zirconia, tin oxide, antimony oxide or the like. The method of forming the insulation coating film is not particularly limited, and there may be used a method of adsorbing the insulating material on the surface of the respective particles by controlling a surface potential of the respective particles in a solution of the material, a vapor deposition method such as CVD, etc.

Next, a resin composition for the bonded magnet according to the present invention is described.

The resin composition for the bonded magnet according to the present invention may be prepared by dispersing the ferromagnetic particles according to the present invention in a binder resin. The resin composition for the bonded magnet comprises 85 to 99% by weight of the ferromagnetic particles and the balance comprising the binder resin and other additives.

The ferromagnetic particles may be previously provided on a surface thereof with an insulation coating film of silica, alumina, zirconia, tin oxide, antimony oxide or the like. The method of forming the insulation coating film is not particularly limited, and there may be used a method of adsorbing the insulating material on the surface of the respective particles by controlling a surface potential of the respective particles in a solution of the material, a vapor deposition method such as CVD, etc.

The binder resin used in the resin composition for the bonded magnet may be selected from various resins depending upon the molding method used. In the case of an injection molding method, an extrusion molding method and a calender molding method, thermoplastic resins may be used as the binder resin. In the case of a compression molding method, thermosetting resins may be used as the binder resin. Examples of the thermoplastic resins used in the present invention include nylon (PA)-based resins, polypropylene (PP)-based resins, ethylene-vinyl acetate (EVA)-based resins, polyphenylene sulfide (PPS)-based resins, liquid crystal plastic (LCP)-based resins, elastomer-based resins and rubber-based resins. Examples of the thermosetting resins used in the present invention include epoxy-based resins and phenol-based resins.

Meanwhile, upon production of the resin composition for the bonded magnet, in order to facilitate molding of the composition and attain sufficient magnetic properties, in addition to the binder resin, there may also be used various known additives such as a plasticizer, a lubricant and a coupling agent, if required. Further, various other kinds of magnet particles such as ferrite magnet particles may also be mixed in the resin composition.

These additives may be adequately selected according to the aimed applications. As the plasticizer, commercially available products may be appropriately used according to the resins used. The total amount of the plasticizer added is about 0.01 to about 5.0% by weight based on the weight of the binder resin.

Examples of the lubricant used in the present invention include stearic acid and derivatives thereof, inorganic lubricants, oil-based lubricants. The lubricant may be used in an amount of about 0.01 to about 1.0% by weight based on a whole weight of the bonded magnet.

As the coupling agent, commercially available products may be used according to the resins and fillers used. The coupling agent may be used in an amount of about 0.01 to about 3.0% by weight based on the weight of the binder resin used.

The resin composition for the bonded magnet according to the present invention may be produced by mixing and kneading the ferromagnetic particles with the binder resin.

The mixing of the ferromagnetic particles with the binder resin may be carried out using a mixing device such as a Henschel mixer, a V-shaped mixer and a Nauta mixer, whereas the kneading may be carried out using a single-screw kneader, a twin-screw kneader, a mill-type kneader, an extrusion kneader or the like.

Next, the bonded magnet according to the present invention is described.

The magnetic properties of the bonded magnet may be controlled so as to attain desired magnetic properties (such as a coercive force, a residual magnetic flux density and a maximum energy product) according to the aimed applications.

The bonded magnet according to the present invention may be produced by subjecting the above resin composition for the bonded magnet to a molding process by a known molding method such as an injection molding method, an extrusion molding method, a compression molding method or a calender molding method, and then subjecting the resulting molded product to electromagnet magnetization or pulse magnetization by an ordinary method to form the bonded magnet.

Next, the sintered magnet according to the present invention is described.

The sintered magnet according to the present invention may be produced by subjecting the ferromagnetic particles to compression molding and heat treatment. The magnetic field applied and the conditions of the compression molding are not particularly limited, and may be adjusted to those values required for the resulting sintered magnet. For example, the magnetic field may be adjusted to the range of 1 to 15 T, and the pressure upon the compression molding may be adjusted to the range of 1.5 to 15 ton/cm$^2$. The molding machine used is not particularly limited, and there may be used CIP or RIP. The shape or size of the resulting molded product may be appropriately determined according to the applications thereof.

The ferromagnetic particles may be previously provided on a surface thereof with an insulation coating film of silica, alumina, zirconia, tin oxide, antimony oxide or the like. The method of forming the insulation coating film is not particularly limited, and there may be used a method of adsorbing the insulating material on the surface of the respective particles by controlling a surface potential of the respective particles in a solution of the material, a vapor deposition method such as CVD, etc.

Examples of the lubricant used in the sintered magnet of the present invention include stearic acid and derivatives thereof, inorganic lubricants, oil-based lubricants. The lubricant may be used in an amount of about 0.01 to about 1.0% by weight based on a whole weight of the in sintered magnet.

Examples of the binder resin used in the sintered magnet of the present invention include polyolefins such as polyethylene and polypropylene; thermoplastic resins such as polyvinyl alcohol, polyethyleneoxide, PPS, liquid crystal polymers, PEEK, polyimides, polyether imides, polyacetals, polyether sulfones, polysulfones, polycarbonates, polyethylene terephthalate, polybutylene terephthalate, polyphenylene oxide, polyphthalamide and polyamides; and mixtures thereof. The binder resin may be used in an amount of about 0.01 to about 5.0% by weight based on a whole weight of the sintered magnet.

The heat treatment may be conducted by appropriately using a continuous furnace, an RF high frequency furnace, etc. The heat treatment conditions are not particularly limited.

Next, the compacted magnet according to the present invention is described.

The compacted magnet according to the present invention may be produced by subjecting the resulting ferromagnetic particles to compression molding in a magnetic field. The magnetic field applied and the conditions of the compression molding are not particularly limited, and may be adjusted to those values required for the resulting compacted magnet. For example, the magnetic field may be adjusted to the range of 1.0 to 15 T, and the pressure upon the compression molding may be adjusted to the range of 1.5 to 15 ton/cm$^2$. The molding machine used is not particularly limited, and there may be used CIP or RIP. The shape or size of the resulting molded product may be appropriately determined according to the applications thereof.

The ferromagnetic particles may be previously provided on a surface thereof with an insulation coating film of silica, alumina, zirconia, tin oxide, antimony oxide or the like. The method of forming the insulation coating film is not particularly limited, and there may be used a method of adsorbing the insulating material on the surface of the respective particles by controlling a surface potential of the respective particles in a solution of the material, a vapor deposition method such as CVD, etc.

Examples of the lubricant used in the compacted magnet of the present invention include stearic acid and derivatives thereof, inorganic lubricants, oil-based lubricants. The lubricant may be used in an amount of about 0.01 to about 1.0% by weight based on a whole weight of the sintered magnet.

Examples of the binder resin used in the compacted magnet of the present invention include polyolefins such as polyethylene and polypropylene; thermoplastic resins such as polyvinyl alcohol, polyethyleneoxide, PPS, liquid crystal polymers, PEEK, polyimides, polyether imides, polyacetals, polyether sulfones, polysulfones, polycarbonates, polyethylene terephthalate, polybutylene terephthalate, polyphenylene oxide, polyphthalamide and polyamides; and mixtures thereof. The binder resin may be used in an amount of about 0.01 to about 5.0% by weight based on a whole weight of sintered magnet.

The heat treatment may be conducted by appropriately using a continuous furnace, an RF high frequency furnace, etc. The heat treatment conditions are not particularly limited.

EXAMPLES

Typical examples of the present invention are as follows.

The specific surface area values of the iron oxide or iron oxyhydroxide as the starting material and the resulting ferromagnetic particles were measured by a B.E.T. method based on nitrogen absorption.

The primary particle sizes of the iron oxide or iron oxyhydroxide as the starting material and the resulting ferromagnetic particles were measured using a transmission electron microscope "JEM-1200EXII" manufactured by Nippon Denshi Co., Ltd. In this case, particle sizes of 120 particles randomized were measured to calculate an average value thereof.

The compositions of the iron oxide or iron oxyhydroxide as the starting material and the resulting ferromagnetic particles were determined by analyzing a solution prepared by dissolving the sample in an acid under heating using a plasma emission spectroscopic analyzer "SPS4000" manufactured by Seiko Denshi Kogyo Co., Ltd.

The constituting phases of the starting material and the resulting ferromagnetic particles were determined by identification using a powder X-ray diffractometer (XRD; "RINT-2500" manufactured by Rigaku Co., Ltd.), by electron diffraction (ED) using a transmission electron microscope "JEM-2000EX" manufactured by Nippon Denshi Co., Ltd., and an ultra-high resolution spectroscopic electron microscope (HREM) "HF-2000" manufactured by Hitachi High-Technologies Corp., or by analysis and evaluation using an electron energy loss spectroscopy (EELS), an energy dispersive X-ray spectroscopy (EDS) or a scanning transmission electron microscope (STEM). In the ED or the analysis and evaluation using EELS, STEM or EDS, it was possible to determine whether or not impurity phases such as $\alpha$-Fe, $Fe_4N$ and $Fe_{3-x}N$, or the metal element X added were locally present in a micro state which could not be determined by XRD.

The volume fraction of FeO was evaluated by the following method.

First, the ferromagnetic particles were measured by an electron energy loss spectroscopy (EELS) to determine a position of FeO (oxygen) being present therein. Next, the ferromagnetic particles were observed by TEM to determine a portion of each particle having a contrast to a central portion of the particle. On the basis of the results of the above electron energy loss spectroscopy (EELS), the position of FeO was determined to measure a thickness of FeO. The volume fraction of FeO was calculated from the thus measured thickness of FeO and the particle shape.

The lattice constant of the resulting ferromagnetic particles was determined using a powder X-ray diffractometer (XRD; "RINT-2500" manufactured by Rigaku Co., Ltd.). The amount of nitrogen was determined from the thus determined lattice constant by referring to the following documents.

REFERENCE DOCUMENTS

Yukiko Takahashi

Doctorial thesis of Graduate School of Tohoku University, School of Engineering, Electrical Engineering, 2001, "Study on synthesis and magnetism of non-equilibrium $\alpha', \alpha'', \gamma$ phases in (C, N)-added Fe-based alloy thin film"

K. H. Jack

Proc. Roy. Soc., A208, 216(1951) "The iron-nitrogen system: the preparation and the crystal structures of nitrogen-austenite ($\gamma$) and nitrogen-martensite (a')"

The magnetic properties of the obtained ferromagnetic particles were measured at room temperature (300 K) in a magnetic field of 0 to 9 T using a physical property measurement system (PPMS+VSM) manufactured by Quantum Design Japan Co., Ltd. Separately, the temperature dependency of a magnetic susceptibility of the ferromagnetic particles in a temperature range of from 5 K to 300 K was also evaluated.

The measurement of Mössbauer spectrum of the obtained ferromagnetic particles was carried out as follows. That is, the ferromagnetic particles were intimately mixed with a silicone grease in a glove box in an argon atmosphere. The resulting mixture was wrapped with an aluminum foil and subjected to the measurement of Mössbauer spectrum in a temperature range of from a liquid helium temperature to room temperature for 3 to 4 days. Further, the obtained data was analyzed to determine a production ratio of $Fe_{16}N_2$ in the obtained ferromagnetic particles. As impurity phases, $\alpha$-Fe, $Fe_4N$, $Fe_{3-x}N$, para-components of iron oxide or the like were analyzed.

The particle size distribution of the starting material was measured in pure water as a solvent using an analyzer "Mastersizer 2000E" manufactured by Malvern Instrument Ltd.

Example 1

Preparation of Starting Material

Spindle-shaped goethite particles having an average major axis diameter of 210 nm, an aspect ratio of 7 and a specific surface area of 118 $m^2/g$ were produced from ferric sulfate, sodium hydroxide and sodium carbonate. The resulting goethite particles were separated by filtration using a nutshe, and the resulting particles were sufficiently washed with pure water in an amount of 150 mL per 5 g of the sample. Successively, the obtained particles were dried at 130° C. using a forced air dryer overnight.

Pulverization Treatment of Starting Material

Next, 3 g of the dried particles as the sample were added to 35 mL of a hexane solvent, and subjected to pulverization treatment together with 3 mmφ silicon nitride beads at room temperature for 4 hr using a planetary ball mill whose inside atmosphere was replaced with a nitrogen gas, and then the resulting particles were taken out again from the ball mill. The thus obtained particles were subjected to measurement of a particle size distribution thereof. As a result, it was confirmed that D50 of the particles was 1.6 μm and D90 thereof was 4.4 μm.

Reducing Treatment and Nitridation Treatment of Starting Material

The above treatment was repeated plural times to prepare the starting material. Then, the starting material was classified by a vibration sieve to extract only aggregated particles having a particle diameter of not more than 90 μm therefrom. Then, 50 g of the obtained sample particles were charged in an alumina sagger (125 mm×125 mm×30 mm in depth), and allowed to stand in a heat treatment furnace. An inside of the furnace was evacuated and then filled with an argon gas, and further evaluated gain. This procedure was repeated three times. Thereafter, while flowing a hydrogen gas at a flow rate of 5 L/min through the furnace, the sample particles were heated to 277° C. at a temperature rise rate of 5° C./min and held at that temperature for 3 h to subject the particles to reducing treatment. Thereafter, the particles were cooled down to 152° C. at which supply of the hydrogen gas was stopped. Meanwhile, it was confirmed that the sample withdrawn in this condition was constituted of an α-Fe single phase and had a specific surface area of 19.5 m$^2$/g. Successively, while flowing a mixed gas comprising an ammonia gas, a nitrogen gas and a hydrogen gas at a mixing ratio of 9:0.95:0.15 at a flow rate of 10 L/min in total through the furnace, the particles were subjected to nitridation treatment at 148° C. for 7 h. Thereafter, while flowing an argon gas through the furnace, the particles were cooled down to room temperature at which supply of the argon gas was stopped, and the inside atmosphere of the furnace was replaced with air over 3 h.

Analysis and Evaluation of Resulting Sample

As a result of subjecting the resulting particles to XRD and ED analysis, the particles comprised $Fe_{16}N_2$, and the content of the $Fe_{16}N_2$ compound phase therein as measured by Mössbauer spectrum was 91%. In addition, the obtained particles had an average major axis diameter of 195 nm, a specific surface area of 19.7 m$^2$/g, a film thickness of FeO of 3 nm and a volume fraction of FeO of 24.6% as well as a nitridation rate of 8.9%. As a result of measurement of magnetic properties of the particles, it was confirmed that the particles had a saturation magnetization value $\sigma_s$ of 238 emu/g as measured at 5 K and a coercive force $H_c$ of 2.1 kOe.

Example 2

Spindle-shaped goethite particles having an average major axis diameter of 665 nm, an aspect ratio of 19 and a specific surface area of 67 m$^2$/g were produced from ferric chloride, sodium hydroxide and sodium carbonate by the same method as in Example 1. The resulting goethite particles were separated by filtration using a nutshe, and sufficiently washed with pure water in an amount of 150 mL per 5 g of the sample. Successively, the obtained particles were dried at 125° C. using a forced air dryer overnight. Further, only the aggregated particles having a particle size of not more than 250 μm were extracted using an atomizer mill and a vibrating sieve. As a result of subjecting the resulting particles to measurement of a particle size distribution thereof, D50 of the particles was 17.1 μm, and D90 thereof was 46.0 μm.

Next, the above obtained sample particles were subjected to reducing treatment and then to nitridation treatment by the same method as in Example 1. Specifically, the reducing treatment was carried out at 288° C. for 2.5 h. Meanwhile, the sample withdrawn in this condition was constituted of an α-Fe single phase and had a specific surface area of 9.3 m$^2$/g. The nitridation treatment was carried out at 152° C. for 4 h while flowing an ammonia gas at a flow rate of 10 L/min.

As a result of subjecting the resulting particles to XRD and ED analysis, the particles comprised $Fe_{16}N_2$, and the content of the $Fe_{16}N_2$ compound phase therein as measured by Mössbauer spectrum was 93%. In addition, the obtained particles had an average major axis diameter of 630 nm, a specific surface area of 9.4 m$^2$/g, a film thickness of FeO of 2 nm and a volume fraction of FeO of 8.6% as well as a nitridation rate of 9.4%. As a result of measurement of magnetic properties of the particles, it was confirmed that the particles had a saturation magnetization value $\sigma_s$ of 226 emu/g as measured at 5 K and a coercive force $H_c$ of 1.9 kOe.

Example 3

Ferrous sulfate and ferric sulfate were weighed at a mixing ratio of 0.96:2 in terms of Fe element and reacted in a high-alkali state in the presence of sodium hydroxide, thereby obtaining cubic magnetite particles having an average major axis diameter of 50 nm, an aspect ratio of 1.01 and a specific surface area of 92 m$^2$/g. The resulting magnetite particles were separated by filtration using a nutshe, and sufficiently washed with pure water in an amount of 200 mL per 5 g of the sample. Successively, the obtained particles were dried at 60° C. using a forced air dryer over 1.5 days. The resulting dried particles were subjected to wet pulverization using a beads mill with silicon nitride beads having a particle diameter of 500 μm in a toluene solvent at a solid concentration of 15% by weight. As a result of subjecting the resulting particles to measurement of a particle size distribution thereof, D50 of the particles was 8.8 μm, and D90 thereof was 15.2 μm. Further, only the aggregated particles having a particle size of not more than 180 μm were extracted using a vibrating sieve. Furthermore, the obtained particles were subjected to reducing treatment and then to nitridation treatment by the same method as in Example 2. Meanwhile, the sample withdrawn in the condition after the reducing treatment was constituted of an α-Fe single phase and had a specific surface area of 38.0 m$^2$/g.

As a result of subjecting the resulting particles to XRD and ED analysis, the particles comprised $Fe_{16}N_2$, and the content of the $Fe_{16}N_2$ compound phase therein as measured by Mössbauer spectrum was 85%. In addition, the obtained particles had an average major axis diameter of 42 nm, a specific surface area of 38.2 m$^2$/g, a film thickness of FeO of 1.5 nm and a volume fraction of FeO of 13.8% as well as a nitridation rate of 11.8%. As a result of measurement of magnetic properties of the particles, it was confirmed that the particles had a saturation magnetization value $\sigma_s$ of 198 emu/g and a coercive force $H_c$ of 1.7 kOe.

Example 4

A mixed solution prepared by adding ferrous chloride and sodium citrate to a mixed solution of sodium hydroxide and sodium carbonate was bubbled with air, thereby obtaining acicular lepidocrocite particles having an average major axis diameter of 2500 nm, an aspect ratio of 45.5 and a specific surface area of 85.9 m²/g. The resulting particles were separated by filtration using a nutshe, and sufficiently washed with pure water in an amount of 200 mL per 5 g of the sample. Successively, the obtained particles were dried at 120° C. overnight, followed by subjecting the particles to heat treatment at 350° C. for 1 h. The resulting dried particles were pulverized using an atomizer, and then subjected to wet pulverization using a beads mill in the same manner as in Example 3. As a result of subjecting the resulting particles to measurement of a particle size distribution thereof, D50 of the particles was 5.4 µm, and D90 thereof was 13.9 µm. Further, only the aggregated particles having a particle size of not more than 180 µm were extracted using a vibrating sieve. Furthermore, the obtained particles were subjected to reducing treatment and then to nitridation treatment by the same method as in Example 2. More specifically, the reducing treatment was conducted in a hydrogen flow at 220° C. for 8 h, and the nitridation treatment was conducted in an ammonia gas flow at 148° C. for 14 h. Meanwhile, the sample withdrawn in the condition after the reducing treatment was constituted of an α-Fe single phase and had a specific surface area of 14.3 m²/g.

As a result of subjecting the resulting particles to XRD and ED analysis, the particles comprised $Fe_{16}N_2$, and the content of the $Fe_{16}N_2$ compound phase therein as measured by Mössbauer spectrum was 87%. In addition, the obtained particles had an average major axis diameter of 2450 nm, a specific surface area of 14.6 m²/g, a film thickness of FeO of 2.3 nm and a volume fraction of FeO of 9.4% as well as a nitridation rate of 10.5%. As a result of measurement of magnetic properties of the particles, it was confirmed that the particles had a saturation magnetization value $\sigma_s$ of 223 emu/g and a coercive force $H_c$ of 2.5 kOe.

Comparative Example 1

Spindle-shaped goethite particles having an average major axis diameter of 180 nm, an aspect ratio of 6.4 and a specific surface area of 127 m²/g were produced from ferric chloride, sodium hydroxide and sodium carbonate by the same method as in Example 1. The resulting goethite particles were separated by filtration using a nutshe, and sufficiently washed with pure water in an amount of 150 mL per 5 g of the sample. Successively, the obtained particles were dried at 130° C. using a forced air dryer overnight. Then, the dried particles were pulverized in an alumina mortar for 3 min, thereby obtaining sample particles having D50 of 63 µm and D90 of 124 µm.

Next, the above obtained sample particles were subjected to reducing treatment and then to nitridation treatment by the same method as in Example 1. More specifically, the reducing treatment was carried out at 300° C. for 2.5 h. Meanwhile, the sample withdrawn in this condition was constituted of an α-Fe single phase and had a specific surface area of 16.2 m²/g. The nitridation treatment was carried out at 158° C. for 11 h while flowing an ammonia gas at a flow rate of 10 L/min.

After completion of the nitridation treatment, an inside of the furnace used was purged with nitrogen at room temperature, and then the resulting particles were withdrawn as such therefrom.

As a result of subjecting the resulting particles to XRD and ED analysis, the particles were in the form of a mixture of $Fe_{16}N_2$, $Fe_4N$ and α-Fe, and the content of the $Fe_{16}N_2$ compound phase therein as measured by Mössbauer spectrum was 79%. In addition, the obtained particles had an average major axis diameter of 160 nm, a specific surface area of 16.5 m²/g, a film thickness of FeO of 5.5 nm and a volume fraction of FeO of 53.4% as well as a nitridation rate of 7.3%. As a result of measurement of magnetic properties of the particles, it was confirmed that the particles had a saturation magnetization value $\sigma_s$ of 178 emu/g as measured at 5 K and a coercive force $H_c$ of 1.2 kOe.

The invention claimed is:

1. A process for producing ferromagnetic particles comprising an $Fe_{16}N_2$ compound phase in an amount of not less than 80% as measured by Mössbauer spectrum, and each having an outer shell in which FeO is present in the form of a film having a thickness of not more than 5 nm, the process comprising the steps of:
    subjecting iron oxide or iron oxyhydroxide having an average major axis diameter of 40 to 5000 nm and an aspect ratio (major axis diameter/minor axis diameter) of 1 to 200 as a starting material to dispersing treatment to prepare aggregated particles having D50 of not more than 40 µm and D90 of not more than 150 µm;
    allowing the obtained aggregated particles to pass through a mesh having a size of not more than 250 µm;
    subjecting the iron compound particles passed through the mesh to hydrogen reducing treatment at a temperature of 160 to 420° C.; and
    then subjecting the resulting particles to nitridation treatment at a temperature of 130 to 170° C.

2. The process for producing ferromagnetic particles according to claim 1, wherein a saturation magnetization value as of the ferromagnetic particles as measured at 5 K is not less than 150 emu/g.

3. The process for producing ferromagnetic particles according to claim 1, wherein a volume fraction of the FeO in the ferromagnetic particles is controlled such that a ratio of a volume of the FeO to a whole volume of the particles is not more than 25%.

4. The process for producing ferromagnetic particles according to claim 1, wherein a coercive force He of the ferromagnetic particles is not less than 1.5 kOe.

5. The process for producing ferromagnetic particles according to claim 1, wherein a nitridation rate of the ferromagnetic particles is 8.0 to 13 mol %, wherein the nitridation rate is determined from a lattice constant of the ferromagnetic particles.

6. The process for producing ferromagnetic particles according to claim 1, wherein a BET specific surface area of the ferromagnetic particles is 5.0 to 40 m²/g.

* * * * *